Figure 3:
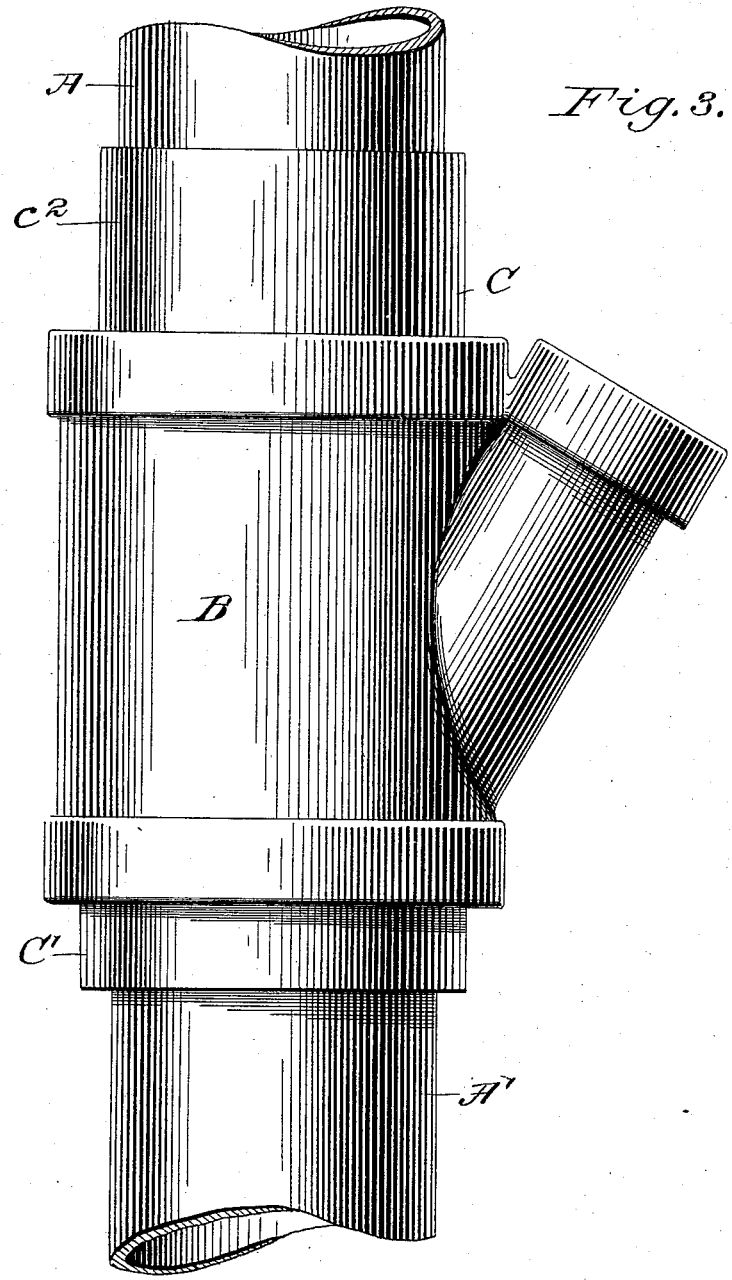

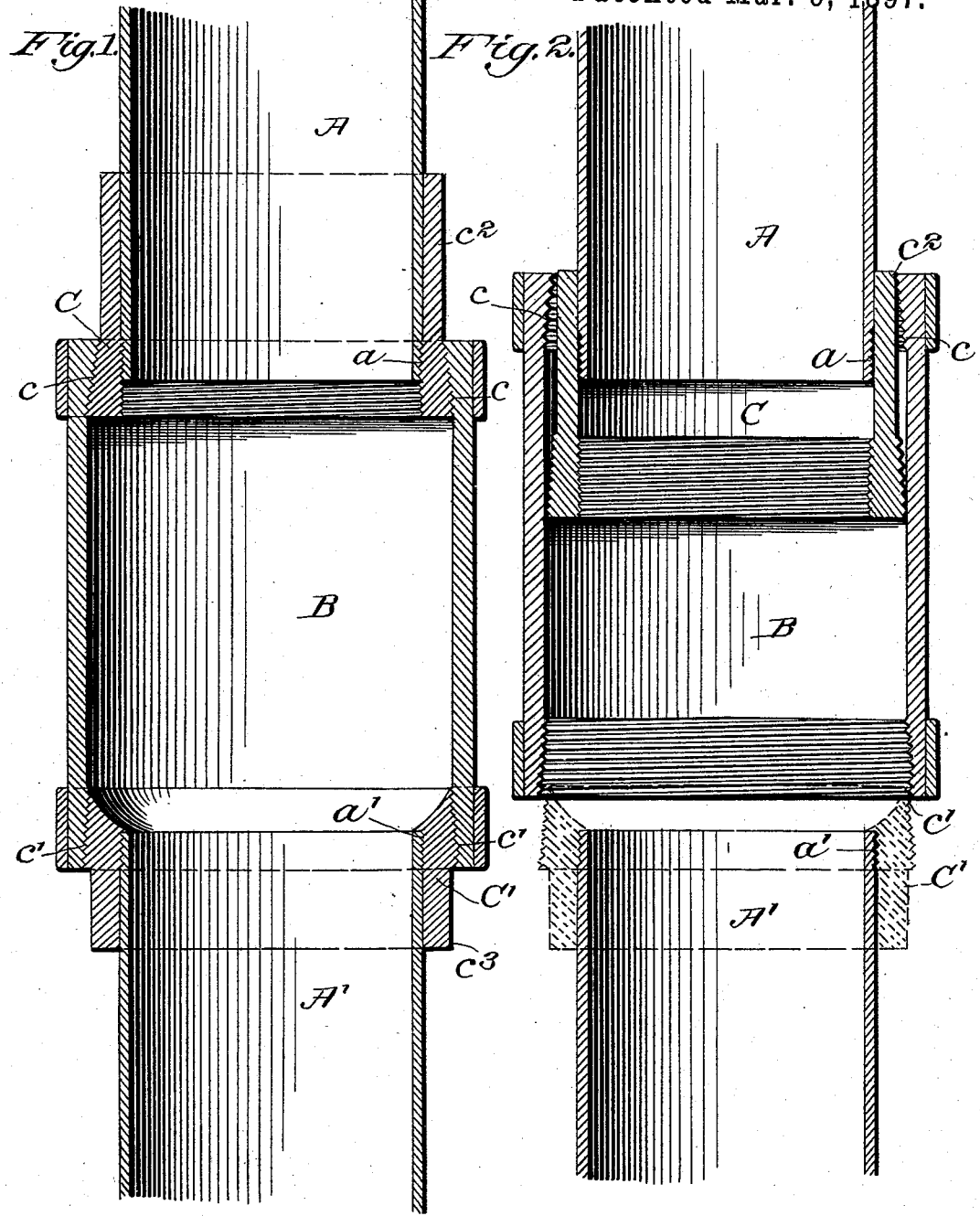

(No Model.) 2 Sheets—Sheet 2.

J. THOMPSON & F. A. PHILLIPS.
PIPE COUPLING.

No. 578,474. Patented Mar. 9, 1897.

WITNESSES:
W. N. Pumphrey.
M. V. Bidgood.

INVENTORS
John Thompson
and Frank A. Phillips
BY
ATTORNEYS

UNITED STATES PATENT OFFICE.

JOHN THOMPSON AND FRANK A. PHILLIPS, OF NEW YORK, N. Y.

PIPE-COUPLING.

SPECIFICATION forming part of Letters Patent No. 578,474, dated March 9, 1897.

Application filed December 11, 1896. Serial No. 615,334. (No model.)

*To all whom it may concern:*

Be it known that we, JOHN THOMPSON and FRANK A. PHILLIPS, citizens of the United States, residing at New York, in the county and State of New York, have invented certain new and useful Improvements in Pipe-Couplings, of which the following is a specification.

This invention relates to improvements in pipe-couplings, and is more especially applicable to junctions of soil-pipes and drain-pipes or analogous cases where two pipes already in place and with their ends not quite meeting have to be connected together, so as to form a continuous and, as far as possible, a tight joint.

Our improved coupling consists of a sleeve or tube-section containing two telescoping bushings screwing into the joint and onto the pipes, the sleeve being so proportioned as to allow it to be slipped cantwise between and over the pipe ends, the bushings being then screwed onto the pipe ends and the sleeve then screwed home over both bushings. The screw-bushings compensate for or allow of slight variations in the distance between the pipe ends and form a tight joint.

By means of this invention we do away with all springing of the pipes to allow slipping on of the coupling and all packing or filling of the joint to render the same tight.

The coupling may also be the means of connecting a branch onto the main pipe, a branch connection being formed on it for that purpose.

In the accompanying drawings, which form a part of this specification, Figure 1 is an axial section of a pipe-coupling embodying our improvement. Fig. 2 is a similar view showing the coupling in process of application. Fig. 3 is an external view of the coupling, the same being here shown with a branch connection formed on it.

A and A' represent the two pipe ends—for example, the ends of a soil-pipe.

B is a sleeve or short pipe-section, which is, as shown, somewhat longer than the distance between the pipe ends, but is sufficiently large in diameter to allow it to be introduced between the pipes by canting it to one side and to be slipped over one of the pipe ends, as A.

The two bushings C C' are adapted to screw onto the respective pipe ends A A' by screw-joints $a$ $a'$ and are screwed in place after the coupling-sleeve B has been slipped over the pipe end. These two bushings are provided in their outside with screw-threaded portions $c$ $c'$, preferably tapered, as shown, to engage with corresponding threaded portions on the inside of the sleeve B. The bushings C C' having been screwed to the proper places, the sleeve B is then let down into place and screwed home, the screw-threaded portions of same screwing onto both of the bushings at the same time and by means of the tapered screws forming a tight joint with both bushings at once. For this purpose the screw-joints at both ends of the sleeve are tapered in the same direction. Each bushing C or C' has an extension or sleeve $c^2$ or $c^3$, respectively, to enable it to be held or turned by an appropriate pipe-wrench.

We are aware that pipe-couplings have been heretofore devised wherein an outer sleeve was screwed over two intermediate bushings, which in turn were screwed onto the ends of the pipes, but we are not aware that any such coupling has heretofore been applied to pipes which were fixed at a certain relative distance before the coupling was put on, thus necessitating the use of coupling parts that can be slipped in between and over the ends of the pipes. This we render possible by making the outer sleeve, which must be longer than the distance between the pipes, of sufficiently large diameter to enable it to be inserted cantwise between and over the ends of the pipes and by making the bushings, which must be of a diameter to screw onto the pipe, sufficiently short to enable them to enter between the pipe ends. Moreover, we prefer to make both of such bushings so short that even their combined length is less than the distance between the pipes, so that both may be put on at once. This is not necessary, however, for as long as either or both of them are shorter than the distance between the end of the other bushing when screwed home and the end of the opposite pipe they can be entered onto the pipes by first screwing on one and then slipping on and screwing up the other.

Having thus described our invention, what we claim as new, and desire to secure by Letters Patent, is—

1. In a pipe-coupling, the combination with the pipes to be joined, relatively fixed at a certain distance apart, of a sleeve, longer than the distance between the pipes to be joined but of larger diameter than the pipes, and two bushings engaging respectively, by screw-threads, with the two pipe ends, and with the two ends of said sleeve each of said bushings being shorter than the distance between the pipes, substantially as set forth.

2. The combination, with two fixed pipes, of a pipe-coupling consisting of a sleeve longer than the distance between the pipes but of a diameter sufficiently larger than the pipes to enable it to be introduced cantwise between and over the same, and two bushings shorter than the distance between the pipes and engaging respectively by internal screw-threads with the two pipe ends and by external screw-threads with the two ends of the aforesaid sleeve, substantially as set forth.

3. The combination with two pipes, of a coupling for the same, consisting of two bushings screwed respectively onto the ends of said pipes, and a sleeve engaging with both of said bushings by internal screw-threads tapered in the same direction, substantially as and for the purpose set forth.

4. The combination with two pipes relatively fixed at a certain distance apart, of a coupling for the same consisting of two bushings screwed respectively onto the ends of said pipes, the combined length of the bushings being less than the distance between the pipes, and a sleeve longer than the distance between the pipes, engaging with both of said bushings by internal screw-threads, substantially as and for the purpose set forth.

5. The combination with two pipes relatively fixed at a certain distance apart, of a coupling for the same consisting of two bushings screwed respectively on the ends of the pipes, each of said bushings being shorter than the distance between the end of the other bushing when screwed home and the end of the opposite pipe, and a sleeve longer than the distance between the pipes and screwed onto both of said bushings.

6. The combination with two pipes relatively fixed at a certain distance apart, of a coupling for the same consisting of two bushings screwed respectively on the ends of the pipes, one of said bushings being shorter than the distance between the end of the other bushing when screwed home and the end of the opposite pipe, and a sleeve longer than the distance between the pipes and screwed onto both of said bushings.

JOHN THOMPSON.
FRANK A. PHILLIPS.

Witnesses:
HERBERT KNIGHT,
J. GREEN.